UNITED STATES PATENT OFFICE.

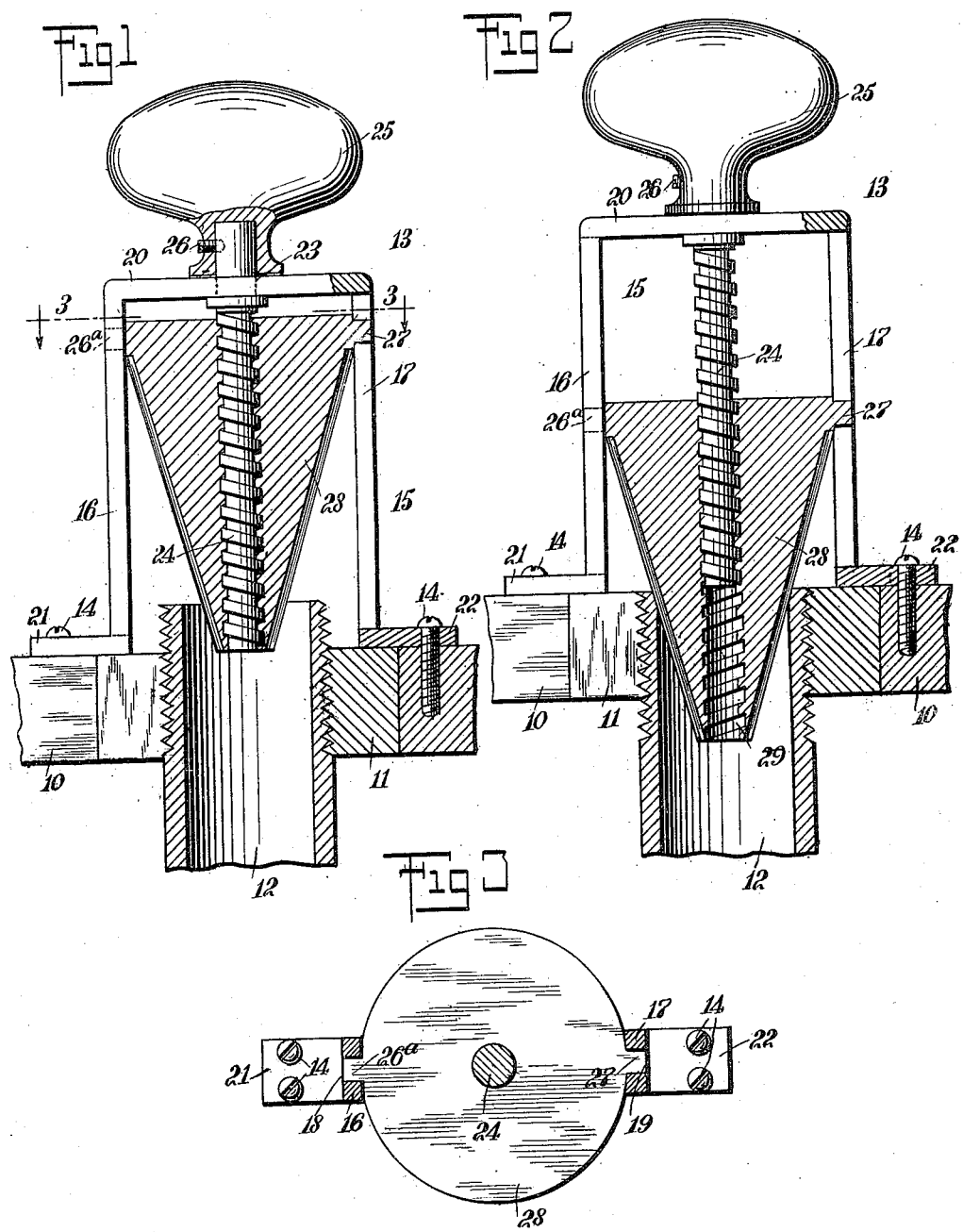

SAMUEL M. STEVENS, OF ASHEVILLE, NORTH CAROLINA.

REAMER.

981,492.

Specification of Letters Patent. Patented Jan. 10, 1911.

Application filed September 9, 1909. Serial No. 516,844.

*To all whom it may concern:*

Be it known that I, SAMUEL M. STEVENS, a citizen of the United States, and a resident of Asheville, in the county of Buncombe and State of North Carolina, have invented a new and Improved Reamer, of which the following is a full, clear, and exact description.

My invention relates to reamers, more particularly to that type of reamer attached to die stocks, and the like, and adapted to ream pipe while the die stock is being removed from the pipe.

My invention comprehends a self-feeding reamer slidably secured to a frame mounted on a die stock or the like, and adapted to ream a pipe after the pipe has been threaded by the die and the die is being removed from the pipe.

My invention further comprehends certain novel features, as will be hereinafter more fully described.

Reference is to be had to the accompanying drawings, forming a part of this specification, in which similar characters of reference denote corresponding parts in all the views, and in which—

Figure 1 is a side elevation showing my device attached to a die-stock having therein a pipe, parts being shown in section; Fig. 2 is a side elevation similar to Fig. 1 but showing my device as applied, parts being in section; and Fig. 3 is a sectional view taken on the line 3—3 in Fig. 1, looking in the direction indicated by the arrows.

A die-stock 10 having therein a die 11, for threading a pipe 12, has attached thereto a reamer 13 by means of suitable bolts 14. The reamer 13 comprises a double slotted frame 15 consisting of uprights 16 and 17 having therein slots 18 and 19, and a cross-piece 20 disposed on the uprights 16 and 17, the said uprights having lugs 21 and 22 integral with the frame 15 and holding the same on the die-stock 10 by means of the bolts 14.

Centrally located in the cross-piece 20 is a hole 23 for slidably receiving a left-threaded screw rod 24 secured to a handle 25 by means of a set screw 26. Disposed between the uprights 16 and 17 and provided with lugs 26ª and 27, adapted to slide in the slots 18 and 19, is a conical-shaped reamer 28 having therein a screw-threaded hole 29 for receiving the screw rod 24, the said screw threads on the screw rod 24 being of a coarse nature and of one-half the number of threads as there are threads on the pipe 12.

The operation of my device is as follows: When the required number of threads have been cut on the pipe 12, by the die 11 in the die-stock 10, the motion of the die-stock 10 is reversed so as to disengage the same from the pipe 12. At the same moment, the handle 25 is turned so as to force the reamer 28 into engagement with the pipe 12, and then by holding the handle 25 stationary, while the die-stock 10 is moving outwardly and disengaging from the pipe 12, the reamer 28 is forced inwardly on the pipe 12 by the left coarse threaded screw rod 24 and is turned by the frame 15 secured to the revolving die-stock 10 and slidably engaged by the reamer 28. This constitutes a self-feeding reamer, and when the pipe is sufficiently reamed, a few turns of the handle 25 will disengage the reamer 28 from the pipe 12.

It will be understood that my reamer can be easily attached to various die-stocks of different sizes, and it will also be understood that I do not limit myself to the precise construction as shown in the drawings, the scope of my invention being defined in the appended claims.

Having thus described my invention, I claim as new and desire to secure by Letters Patent:

1. In combination, a die-stock having a die adapted to engage and thread a pipe, a reamer mounted to turn with the die-stock and having an axial movement relative to the die and pipe, and means between the die-stock and the reamer whereby the unscrewing of the die from the pipe will move the reamer in an opposite direction into reaming engagement with the pipe.

2. In combination, a die-stock having a die adapted to engage and thread a pipe, a reamer mounted to turn with the die-stock and having an axial movement relative to the die and pipe and an operating connection between the die stock and the reamer whereby the unscrewing of the die from the pipe will move the reamer in an opposite direction and into reaming engagement with the pipe.

3. In combination, a die-stock having a die adapted to engage and thread a pipe, a reamer mounted to turn with the die-stock, and a screw engaging the reamer, with the threads on the screw of opposite pitch to the threads on the pipe, to move the die and the reamer toward each other to engage the reamer with the pipe and ream the same on unscrewing the die from the pipe.

In testimony whereof I have signed my name to this specification in the presence of two subscribing witnesses.

SAMUEL M. STEVENS.

Witnesses:
J. D. PENLAND,
E. J. RANDOLPH.